Dec. 8, 1931.  F. M. COVEY  1,835,933
AIRCRAFT PROPELLER
Filed Jan. 24, 1930
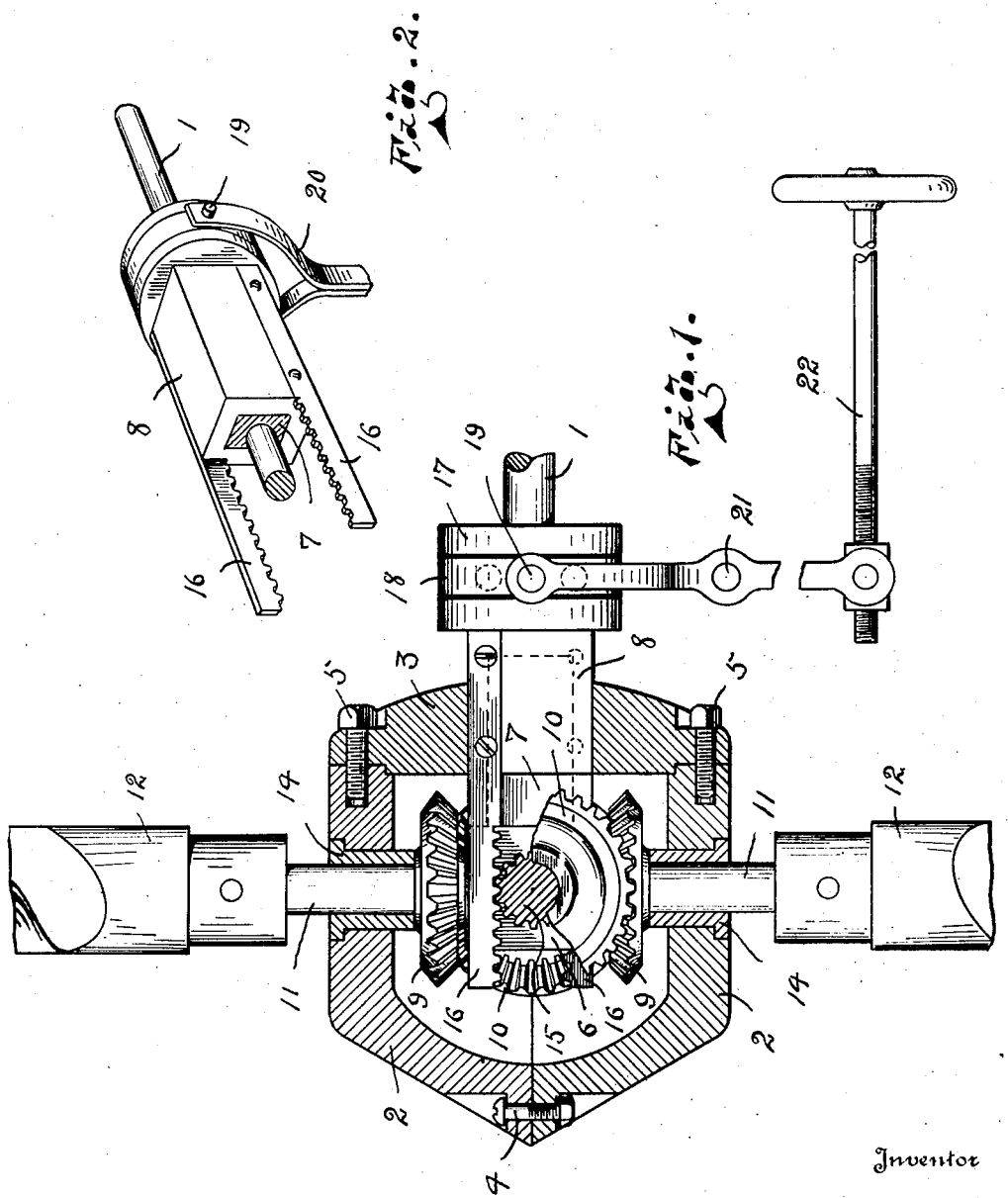
Inventor
Felix M. Covey.
By
Geo Stevens
Attorney Patented Dec. 8, 1931

1,835,933

UNITED STATES PATENT OFFICE

FELIX M. COVEY, OF DULUTH, MINNESOTA

AIRCRAFT PROPELLER

Application filed January 24, 1930. Serial No. 423,088.

This invention relates to adjustable screw propellers and has special reference to one particularly adapted for use upon aircraft, and in which the blades are axially adjustable in feathering same.

The principal object is to provide a simple, efficient, and practical mechanism for selectively feathering the blades of such a propeller.

Other objects and advantages of the novel structure will appear in the following description thereof.

Referring now to the accompanying drawings, forming part of this application, and wherein like reference characters indicate like parts:

Figure 1 is a vertical section partly in elevation through the hub of an aircraft propeller embodying the invention; and Figure 2 is an enlarged perspective view of the reciprocable portion of the mechanism as it appears on the propeller shaft.

1 represents the shaft of the propeller which extends as is well known just outboard of the engine housing of the aircraft, and upon the end of which is carried the propeller hub which in this instance is shown as comprising two like separable halves 2, they being hollow and held together when united as by the inner cap 3 and bolt 4, though it is to be understood that this portion of the structure may be materially altered if desired without departing from the spirit of the invention. The cap 3 is illustrated as being attached to the portions 2 of the hub by suitable tap screws 5.

Directly upon the extreme outer end of the shaft 1 is rigidly fixed in any desired manner the squared head 6 provided with a similar squared but reduced shank portion 7 which extends inwardly of and telescoped by the squared elongated sleeve 8.

Radially about the squared head 6 are mounted a set of four cooperative miter gears 9—9 and 10—10, the former being mounted and fixed to its respective shank 11 of the two opposed propeller blades 12, while the latter are each mounted upon short pins or trunnions 13, in all respects similar to the shanks 11 except that they do not extend beyond the hub unless peradventure in some instances they may so extend and carry propeller blades similar to the blades 12, in the event of the device being applied to a four blade propeller. The shanks 11 of the blades may be journalled in special journal sleeves 14 if desired, the details of which construction do not enter into my present invention.

It may here be stated that the adjacent ends of the shanks 11 may or may not extend into the squared hub 6 as desired, though it is evident that such journal within the hub 6 would add to the general strength and rigidity of the assembly.

Concentric with each of the gears 10 and preferably integral therewith is formed a spur gear or pinion 15, these being for constant cooperative engagement with the finger racks 16 which are attached to or formed integral if desired with diagonally disposed corners of the sleeve 8 so that any reciprocal motion of the sleeve will tend to rotate the pins 15 which will carry with them their respective miter gears 10. The racks 16 being upon opposite corners of the sleeve will engage the pinions 15 upon opposite sides and thus rotate same in opposite directions, and as such rotative motion will be directly imparted to the shanks 11 of the propeller blades, the latter will be correspondingly adjusted or feathered. The sleeve 8 being squared in cross section requires a square hole in the cap 3 in which it is reciprocally mounted, thus insuring a firm, non-rotatable union with said cap which assists in maintaining proper alignment of the racks 16 with their respective gears. This, together with the square shank 7 of the hub 6 in which the propeller shaft 1 is mounted, as before stated, provides a firm, non-rotatable union of the entire propeller hub upon the shaft.

To that portion of the sleeve 8 which extends inwardly beyond the cap 3 of the propeller hub is provided an enlarged cylindrical portion 17 about which is formed an annular channel for reciprocation of the ball bearing clutch collar 18 having opposed pins or gudgeons 19 to which the adjusting fork 20 is attached for reciprocable movement of the sleeve 8. This fork may be in all respects similar to a sliding clutch fork common to those in the art, pivoted as at 21, and provided with any desired form of manual adjusting means such as the screw threaded hand operated shaft 22.

It is known that adjustable propeller blades is old in the art, but it is deemed that in my present invention I have provided a novel and simple assembly not heretofore known.

Having thus described my invention, what I claim and desire to secure by Letters Patent, is:

1. A propeller blade feathering mechanism comprising a set of miter gears cooperatively uniting the shanks of said blades, a spur pinion fixed axially to each of two opposite ones of said miter gears, and racks cooperatively engaging said pinions manually reciprocable longitudinally of the propeller shaft.

2. A propeller blade feathering mechanism comprising a propeller shaft, a multi-faced hub fixed to the end of the shaft, a beveled gear mounted adjacent each face of said hub, all of said gears being cooperatively engaged, a hollow hub inclosing said gears and first mentioned hub, oppositely disposed propeller blades having shanks extending through the walls of the outer hub, each carrying one of said gears, the other of said gears each carrying a spur gear concentric therewith and adjacent the innermost hub, a reciprocal member non-rotatable in respect to the propeller shaft and carried thereto adjacent the innermost hub, racks carried by the reciprocal member in constant engagement with said pinions, and means for manually operating the reciprocal member.

3. A propeller blade feathering mechanism comprising a set of four miter gears in constant cooperative engagement, a hub about said gears carrying opposed propeller blades, the shanks of which are fixed to two opposite ones of said gears, a propeller shaft having a square hub disposed intermediate of said gears, and manual reciprocal means carried by said shaft adjacent said hub for imparting rotary motion to two of said gears.

4. A propeller blade feathering mechanism comprising four intermeshed miter gears, two of said gears being fixed to the shanks of the propeller blades and the other two of said gears each carrying a pinion, a rack meshing with each pinion, and means for reciprocating the racks.

In testimony whereof I affix my signature.

FELIX M. COVEY.